(12) United States Patent
D'Hoore et al.

(10) Patent No.: US 8,378,875 B2
(45) Date of Patent: Feb. 19, 2013

(54) METHOD OF PROGRAMMING A UNIVERSAL REMOTE CONTROL

(75) Inventors: Michael Walter Paul D'Hoore, Korbeek-Dijle (BE); Juergen Forscht, Nanolstadt (DE); Rogier Louis Jacques Willem Thissen, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1012 days.

(21) Appl. No.: 12/282,692

(22) PCT Filed: Mar. 5, 2007

(86) PCT No.: PCT/IB2007/050714
§ 371 (c)(1),
(2), (4) Date: Mar. 6, 2009

(87) PCT Pub. No.: WO2007/105142
PCT Pub. Date: Sep. 20, 2007

(65) Prior Publication Data
US 2009/0237287 A1    Sep. 24, 2009

(30) Foreign Application Priority Data
Mar. 15, 2006  (EP) ..................... 06111201

(51) Int. Cl.
*H04L 17/02* (2006.01)
*G05B 11/01* (2006.01)
(52) U.S. Cl. ...................... 341/176; 348/734; 340/12.28
(58) Field of Classification Search .................. 341/176; 340/4.11, 12.23, 12.28; 348/114
See application file for complete search history.

(56) References Cited

U.S. PATENT DOCUMENTS

| | | | |
|---|---|---|---|
| 5,872,562 A | 2/1999 | McConnell et al. | |
| 6,008,735 A | 12/1999 | Chiloyan et al. | |
| 6,344,817 B1 | 2/2002 | Verzulli | |
| 6,774,813 B2 | 8/2004 | Van Ee et al. | |
| 2003/0141987 A1* | 7/2003 | Hayes | 340/825.72 |
| 2003/0189509 A1* | 10/2003 | Hayes et al. | 341/176 |
| 2004/0257239 A1 | 12/2004 | Griesau et al. | |
| 2005/0144562 A1* | 6/2005 | Schena et al. | 715/741 |
| 2006/0089118 A1 | 4/2006 | Whitehouse | |

FOREIGN PATENT DOCUMENTS

| | | |
|---|---|---|
| WO | 0070577 A1 | 11/2000 |
| WO | 0243022 A2 | 5/2002 |
| WO | 03083801 A2 | 10/2003 |

* cited by examiner

Primary Examiner — Don N Vo

(57) ABSTRACT

A method for setting up a Remote Control is described. In one step (1) a configuration mode is entered. In another step an identifier entry is accepted (3). In case that the identifier is a brand-id the remote control scans though code-sets corresponding to the brand by sending a remote control signal (7), checking for a user reaction (8), testing further remote control signals of a user selected code-set (9) and checking for a user approval of the selected code-set (10) and wherein the step of scanning is repeated until a user approval is entered. Lastly the remote control installs the user approved code-set (13). In case that the identifier is a code-set-id the remote control sends a remote control signal of the corresponding code-set (7), checks for a user reaction (8), tests further remote control signals of the code-set (9) and checks for a user approval of the code-set Moreover the invention describes a Remote Control that is capable of performing the previously described steps.

15 Claims, 5 Drawing Sheets

```
. . .
TV
    Philips:  0392, 1253, 5547, 2236,
              4587, 4566,
5689, 6588
    Philco:  5689, 4566
. . .
```

```
. . .
DVD
    Sanyo: 5661

Sony: 0023, 0024, 2566, 4456
. . . .
```

FIG. 1

| ... | ... | ... | ... |
|---|---|---|---|
| Philips | 9375 | Samsung | 9973 |
| Pioneer | 9376 | Sony | 9876 |
| ... | ... | ... | ... |

FIG. 2

| | |
|---|---|
| . . | |
| TV 9375 =Philips | 0392, 1253, 5547, 2236, 4587, 4566, 5689, 6588 |
| TV 9376 =Pioneer | 5697, 4566, 4567, 4588, 6994, 0122 |
| TV 9876 =Sony | 0036, 4563, 5642 |
| . . . | |
| DVD 9375 =Philips | 6545, 6653, 7564 |
| . . . | |
| DVD 9973 =Samsung | 1212, 0126, 4456, 3365 |
| DVD 9876 =Sony | 0023, 0024, 2566, 4456 |
| . . . | |

FIG. 3

| | |
|---|---|
| . . . | . . . |
| Philips 9375 (an actual pointer to a list of codesets) | Samsung 9973 (an actual pointer to a list of codesets) |
| Philco 5689 (a single codeset-id) | Sanyo 5661 (a single codeset-id) |
| Pioneer 9376 (an actual pointer to a list of codesets) | Sony 9876 (an actual pointer to a list of codesets) |
| . . . | . . . |

FIG. 4

METHOD OF PROGRAMMING A UNIVERSAL REMOTE CONTROL

BACKGROUND OF THE INVENTION

1. Technical Field

The present invention generally relates to a Universal remote control (URC). Moreover the present invention relates to a method of programming an URC, e.g., by using brand- and code-set identifiers.

2. Description of Related Art

Multiple ways exist how a user can configure a Universal Remote Control (URC) or another device with URC functionality to work with his CE equipment (like TV, Amps, DVD-players, . . . ). Most URCs actually offer a multitude of ways to do this. The goal of all these methods is to help the user to easily find the best-matching 'IR code-set' (set of IR codes) for the URC to control the CE equipment. Finding that best-matching code-set is not easy due to the high number of possible code-sets for a certain Brand/Device combination. E.g. for Philips TVs a user has to pick one of 10-15 code-sets.

The most popular ways of configuring that URC are listed below. All have drawbacks as described.

1. Enter a code-set from the manual (further referred to as method 1).

The user uses the manual to look up a combination of Brand and Device-type (e.g. TV, DVD, . . . ). It is possible that the universal aspect of the remote is limited to just one Device-type, often TV. There he finds a list of code-set-ids he needs to punch in on his URC. Often these code-set-ids consist of 3 to 5 digits (seemingly random). Before entering the first code-set-id, the user needs to press some 'magic' combination of keys (or a special) key to go to programming mode. After having entered the first code-set-id, the user can try out the codes of the installed IR code-set to verify if that works on his CE equipment. If the user isn't happy (since some codes are not working, or he sent the wrong code), he can use the programming mechanism to enter another code-set-id and try again.

The main drawback of this scenario is that it's tedious for a user to enter the code-set-id digits and try to find a code-set that works. Many will not have any effect on the equipment at all. Also this requires a pretty extensive list, that contains all combinations of Brand/Device-types and their list of code-set-ids to be tried. This list may be in a manual or on a web site in the case that users get web support. The above is illustrated in FIG. 1 that shows part of the URC's manual that a user uses to look-up the Code-set-ids for the Brand/Device-type combinations.

2. Auto-scan (also known as auto-search, further referred to as method 2)

Auto-scan makes it simpler for a user to find a code-set that works. Here the user presses another 'magic combination of keys', optionally selects the device-type he wants to search for (i.e. By pressing the 'TV', or 'DVD' button on his URC). Then he presses a key to start auto-scan. In some variants he has to keep a certain button pressed. The URC starts iterating through all code-sets for the selected device and sends one or more IR-functions in the code-set (often Power-toggle or Power-off) to the equipment. As soon as the CE device reacts (by either turning off, on, or any other response to the IR-code sent), the user presses a button (or releases a button he was holding). Now he can try if the other keys work as well, or have a mechanism to restart auto-scan trying to find another code-set that works better.

The main drawback of this auto-scan it that it can take a long time for the URC to find a working code-set. Also continuing auto-scan when it finds a sub-optimal code-set, i.e. some functions/codes are missing or not working properly, is tedious.

The methods 1 and 2 are disclosed in U.S. Pat. No. 6,344,817 B1.

3. Brand-search (further referred to as method 3).

Using Brand-search the user has to enter a brand-id (instead of a code-set-id) and choose the device-type he wants to find IR-codes for. There is a 'magic' key-press to start this procedure. Then the user types the ID of the brand of his CE equipment and presses the device-button (TV, DVD, Sat, AMP). Then an auto-scan starts, but only for the code-sets for that certain brand (not for all brands as in auto-scan).

The main advantage is that this is a lot quicker then auto-scan. The drawback is that a manual is needed to look up the brand-ids, although it is briefer than the manual needed for method 1. Another big drawback is that for all brands the URC needs to keep a reference to all the code-sets for a certain brand/device-type combination. This consumes a lot of storage space. For that reason often only the bigger brands are supported for this mechanism. If the right brand is not in this list, the user is referred to method 1 or 2. As explained herein above, in case of method 1, a bigger manual is needed. Also the user has to try multiple methods that all work different and therefore needs to read through many pages of the manual before he successfully can configure his URC. The user has to select the correct method to be used, which may be confusing.

Another disadvantage is that brands that are not in the list of supported-brands will never work. Users will have to revert to method 1. FIG. 2 shows a part of the manual that the user uses to look up the brand-ids. This table is much shorter than the table for method 1, since it only contains the brand-ids for the top brands. The Philco and Sanyo brands are not in here to save space on the URC's storage. Inside this storage there is another table that links the brand-ids per device-type to the list of code-sets that brand-search will iterate through. This is shown in FIG. 3. Brands that are introduced after the production of the remote will never be covered using brand-search. When new brands appear on the market, a software update of the URC is needed. Also in case there is a new code-set-id for a given brand/device-type combination brand search does not work. Furthermore, brand-search assumes all brand and corresponding brand-ids are fixed.

It is an object of the invention to provide a URC with an easy setup while requiring limited memory resources. Moreover it is an object of the invention to provide a setup method for a URC that is easy for a user.

SUMMARY OF THE INVENTION

According to an aspect of the invention, a method is provided for setting up a Remote Control. It comprises the steps of: entering a configuration mode, accepting an identifier-entry, and scanning though remote control code-sets. The step of scanning comprises: in case that the identifier entry is a brand-identifier, iterating through the remote control code-sets corresponding to the brand and testing said remote control code-sets, and in case that the identifier-entry is a code-set-identifier: testing the remote control code-set corresponding to the code-set-identifier.

This allows making the configuration of a URC simpler for a user. At the same time it makes producing the so created simpler URC cheaper for the manufacturer because there is no additional need for electronic storage and the instructions for use (e.g. manual) can be kept a lot smaller.

The main improvement is to combine the 'Brand-id' (as used in the Brand-search method) with the 'Code-set-id' (as used in the 'manual code-set-id selection' method). To the user all these ids appear to be 'Brand-ids'; some of these ids are actual Brand-ids (referring to a pre-programmed list of code-set-ids for a certain brand/device-type combination); others are actual code-set-ids. For brands/device-type combinations that have only a low number of code-sets, or the first code-set has a very high success-rate, the user will punch in the code-set-id directly. This means there is no additional memory usage for making a pointer from a brand-id to code-set-ids. In technical terms the notion of code-set-ids and brand-ids still exists, but this is made invisible to the user. There might be a numbering convention to distinguish between brand-ids and code-set-ids (e.g. all brand-ids start with 8 or 9).

The method according to the present invention has numerous advantages:

Within the same memory constraints, the Brand-search can be extended to ALL brands, not a small subset of popular brands.

It is easier for a user, since there is no fallback scenario from Brand-search to Auto-scan or manual Code-set-id selection needed, anymore.

There is no need for an extensive manual as needed for the Code-set-id selection method (method 1). It makes configuration of URC functionality easier for users.

In the method according to the invention by only changing the instructions for use, almost all brands can be supported. In case that a new brand appears, the instructions for use should reflect this new brand by means of the code-set-id of the basic IR-code-set that it uses. To the user this code-set-id appears to be the brand-id of the new brand. This assumes that this basic IR-code-set is already in the IR-Database (which is often the case).

According to an embodiment of the invention, the iteration through remote control code-sets corresponding to the brand continues until a user approval of a remote control code-set is entered or until all the remote control code-sets corresponding to the brand have been tested. In this way, the success rate of finding a working remote control code-set for the brand is made as high as possible. If the user approves of a certain remote control code-set, it is installed into the remote control.

Preferably, the step of testing a remote control code-set comprises the steps of: sending a remote control signal of the remote control code-set (preferably power toggle or power on/off), checking for a user reaction, and in case of a user reaction, enabling the user to test keys of the Remote Control for the remote control code-set. So, first a limited test of the code-set is performed sending one or a few codes. If this/these code(s) work correctly, the user reacts, for example by pressing a key of the remote control. He is then given the opportunity to test also the other codes. This way of testing is very efficient, because the user only has to perform an extensive test for the code-sets for which the first code(s) worked, correctly. For the other code-sets no full test has to be performed.

According to a further preferred embodiment of the invention, a device type entry is accepted. In this way, the scanning can be limited to code-sets for a certain device type, thereby substantially reducing the time of the scanning process.

Because there is a small possibility that the brand-search initiated by this method doesn't result in a working URC, the programming of the URC will automatically go to a further scanning step where the remotes iterates through all 'back-up' code-sets for the selected device-type, if no working code-set was found during the first scanning step.

In order to shorten the user manual by taking out the minor brands, or to allow new brand names with existing codes sets, a wild card (e.g. "0000") may be selected that will scan through all code sets. Preferably, the code sets of minor brands with the highest likelihood are first scanned through.

According to a further embodiment the use of a numerical keyboard for entering a brand-identifier comprising letters is enabled. This brand identifier preferably is the name of the brand. In this way, the user can write the brand-identifier by means of the numerical keyboard of the remote control in the same way as writing SMS-messages using the numerical keyboard of his mobile phone. Since most users have experience in writing SMS-messages, this results in a very comprehensible way of entering the brand identifier.

According to a further aspect of the invention another method for setting up a Remote Control is provided. It comprises the steps of: entering a configuration mode, scanning though remote control code-sets, testing if individuals keys of a code set send correct codes and receiving user-feedback on the correct and/or incorrect working of the tested keys, replacing non-working codes by codes from at least a further remote control code-set, combining codes from the remote control code-sets and storing them for use by the remote control. So, a number of remote control code-sets are combined into a single remote control code-set. The single remote control code-set is installed in the remote control. This is very practical if there are multiple code-sets that trigger a reaction on the equipment to be controlled but also comprise a few codes that do not work.

According to an embodiment codes from the same remote control code-set are assigned to keys belonging to a certain key-group. In practice it is very likely that if one key of a certain keygroup works, all keys will work if their functions are taken from the same IR-codeset. This will speed up the set-up of the remote.

According to a further embodiment based on the testing step the user-feedback is used to limit or extend the set of remote control code-sets that are scanned through. For example, if the user feeds-back that a certain button is or isn't working, this information can be used to remove codesets from the set of codesets that haven't been iterated through, yet. This will speed up the set-up of the remote.

Preferably, the method according to the invention is implemented by means of a computer program.

According to a further aspect of the invention a remote control is provided comprising memory means storing brand identifiers pointing to a list of code set-identifiers for the brand and storing single code set-identifiers which are not pointed to by a brand-identifier.

According to a still further aspect of the invention a remote control is provided comprising:
  means for entering a configuration mode,
  means for accepting an identifier-entry,
  means for scanning though remote control code-sets
    wherein the means for scanning are adapted for:
    in case that the identifier entry is a brand-identifier,
      iterating through the remote control code-sets corresponding to the brand and testing said remote control code-sets,
    in case that the identifier-entry is a code-set-identifier:
      testing the remote control code-set corresponding to the code-set-identifier.

According to a still further a further aspect of the invention a remote control is provided comprising
  means for entering a configuration mode:
  means for scanning though remote control code-sets,
  means for testing if individuals keys of a code set send correct codes and receiving user-feedback on the correct and/or incorrect working of the tested keys, means for replacing non-working codes by codes from at least a further remote control code-set, means for combining codes from the remote control code-sets and storing them for use by the remote control.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 1 shows entries for a code-set from a user manual according to the prior art.

FIG. 2 shows a part of a manual that the user uses to look up the brand-ids according to the prior art.

FIG. 3 shows a table that links brand-ids per device-type to a list of code-sets that a brand-search will iterate through according to the prior art.

FIG. 4 shows an example of a table with actual pointer to a list of code-sets.

Throughout the figures like reference numerals refer to like elements.

DETAILED DESCRIPTION OF THE PRESENT INVENTION

The table of FIG. 4 shows an example of a table with actual pointers to a list of code-sets. Ids starting with a 9, the brand-ids, (Philips, Pioneer, Samsung, Sony) are actually a pointer to a list of code-set-ids for a certain brand/device-type combination. All other ids (Philco, Sanyo) are actually single code-set-ids. The digit convention is just to illustrate the invention. For the user there is no difference between the brand-ids and the single code-set-ids, the URC's software handles the two different kinds of ids.

For Philips the software-algorithm will look up the code-sets to use by using the brand-scan process in the software. For Philco it will only use Code-set-id 5689. Another Philco code-set-id (4566) will not be used since it is very unlikely to be the correct code-set anyway.

Another advantage of this approach is that because the actual code-set-ids can be entered in the setup, it is possible for the user to type in the correct code-set in one go. This allows the support of brands that were not in the brand-list at the time the remote was produced, but use a code-set that is already available in the Database. In that case the instructions for use should be amended accordingly or the helpdesk could instruct the user which ID to enter. In case that a new brand appears, the instructions for use should reflect this new brand by means of the code-set-id of the basic IR-code-set that it uses. To the user this code-set-id appears to be the brand-id of the new brand. This assumes that this basic IR-code-set is already in the IR-Database (which is often the case).

The instructions for use may be in the form of a paper manual or in electronic form for example on a user support web site.

This approach works best if the remote control is universal for only one device-type (i.e. TV), which is the majority. In other cases a different brand-list should be present in the instructions for use for each device-type. Alternatively, a single list could be used for all device types.

Steps to Configure a URC Using a Preferred Method of the Invention.

Figure 5:
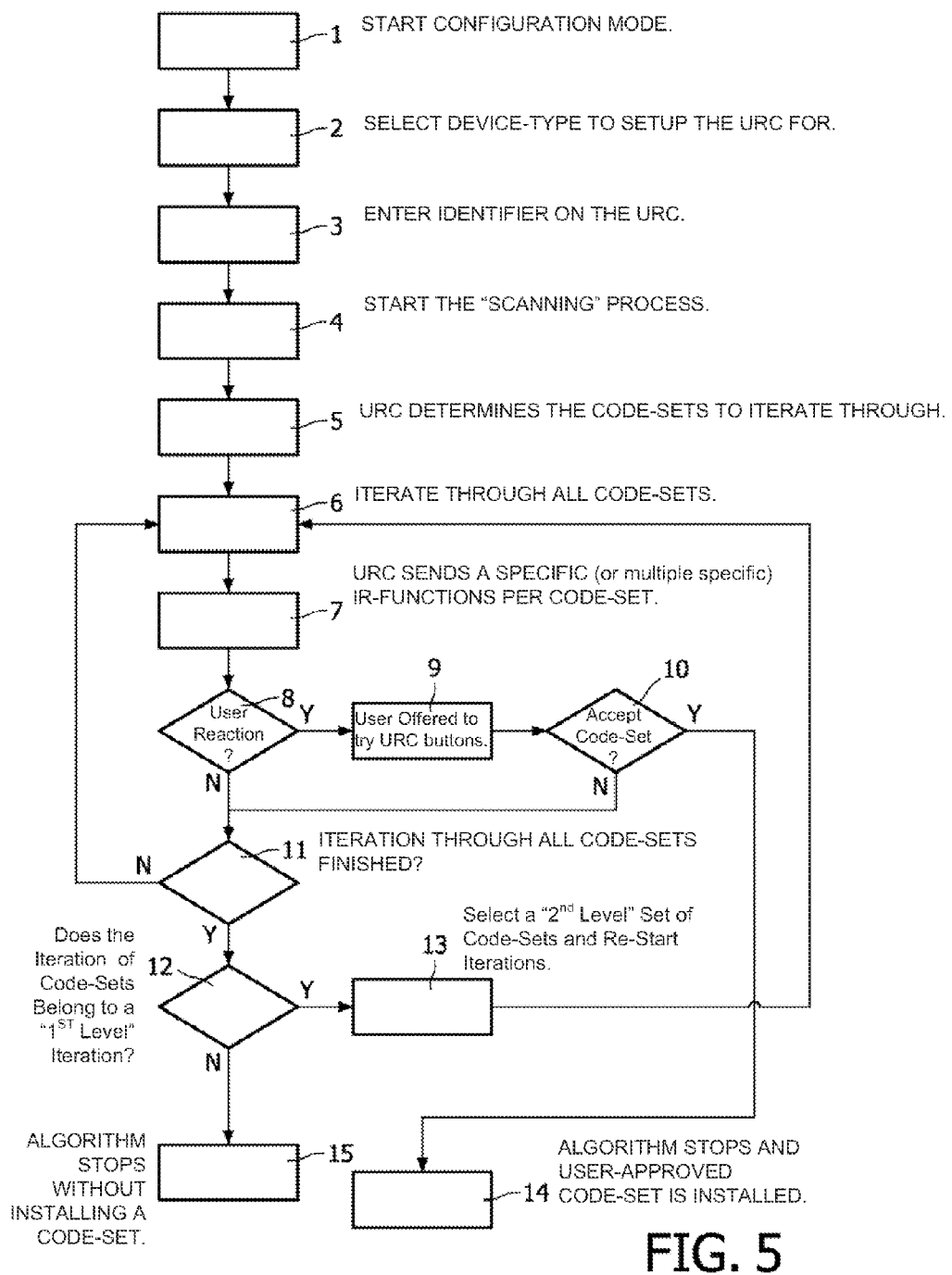
FIG. 5 shows steps to configure a URC using a preferred method.

The User Interaction can resemble a typical Brand-search approach. The steps are shown in FIG. 5 and may actually be in a different order in different embodiments. The different steps are described below.

The user starts the configuration mode of the URC (step 1). There may be different mechanisms to do this, such as pressing a setup-key for a longer time, or by means of a 'magic' key-press where different buttons are pressed simultaneously.

If the remote is universal for more than one Device-type, the user selects the Device-type he wants to setup the URC for (step 2). This could be TV, VCR, DVD, Sat, Amp, . . . as supported by the URC. This step is optional.

Alternatively, the device type is not selected and the scanning process described herein after includes code sets for all device types for which the URC is suitable. Note that this selection may be combined in step 1 if the magic key-press contains the button for the device-type to be configured.

The user looks up the Brand-id or the single code-set-id in the instructions for use of the remote and enters it on the URC (step 3). As explained herein above, to the user all these ids appear to be 'Brand-ids'. Optionally a LED may be used to confirm the successful or unsuccessful acceptance of the entered digits. Optionally there is an id to press if the Brand is unknown or not in the list (e.g. 0000, a so called "wild card").

The user starts the 'scanning' process (step 4). They may be implemented by pressing a button on the URC or by pressing & holding a button.

The URC determines the code-sets to iterate through (step 5). If the entered ID was a pointer to a set of code-sets, the software iterates through all these codesets (step 6). If the ID was a specific Code-set-id only, the list will only contain that single Code-set and proceed (step 6). During the iteration, the URC sends a specific (or multiple specific) IR-functions per code-set (step 7). In step 8 it is checked if there is a user reaction. If there is no user reaction, the algorithm waits a certain time. Then it is checked if the iteration through the code-sets is finished (step 11). If this is not the case the iteration is continued (step 6). The next code-set is retrieved and a specific (or multiple specific) IR-functions is/are sent. When there is a user reaction (by pressing a key or by releasing the pressed key) or when the last IR-code is sent, the iteration stops.

If the user reacted, he is (optionally) offered to try the buttons of the URC for the selected code-set (step 9). Steps 7, 8 and 9 together form the step of testing said remote control code-sets.

In step 10 the user indicates if he accepts the current remote control code-set or not. If the user accepts, then the algorithm stops and the user approved code-set is installed (step 14). If the user doesn't accept, the scanning process is continued by going to step 11.

In step 12 the algorithm checks if the iteration, that was finished in step 11, was an iteration of code sets belonging to a brand ("first level" iteration). If so, the algorithm proceeds to step 13. This means that no code-set was found by iterating through the available code-sets. In step 13 a "second-level" set of code sets is selected and the iteration is re-started. This 'second-level' set could for instance consist of a list containing 1) all Brands for the device-type and/or 2) a list of back-up code-sets known to be likely candidates. Then the algorithm continues with this new list to iterate through at step 6.

If in step 12 the algorithm determines that the iteration, that was finished in step 11, was a second-level iteration, the algorithm stops without installing a code-set (step 15).

Alternative Embodiments

In a different embodiment, the invention may be used to set-up the URC-functionally of a set-top box, PVR, . . . . This may happen when the set-top-box controls other devices like a Satellite or cable receiver.

Instead of IR-codes, the idea can also be applied to RF codes.

SMS-Keyboard Entry of the Brand

In the description above, the Brand-id is represented as an x-digit code (x=4 in the examples). This always requires lookup in the manual. To make it even easier the SMS-keyboard can be used instead. On a GSM phone the '2' key also has the letters 'ABC' assigned, '3' has 'DEF'. The SMS-keyboard is a way to compose words using the numerical keypad as found on phones. Because on remotes the same 'keyboard' is used (so these letters are also printed on the digit keys), it is possible to perform similar composing.

Assuming the 'single-tap' SMS keyboard, one can spell 'P H I L I P S' as: '7445477' (so each digit once), Sony becomes '7669', etc. Alternatively, the use of 'multi-tap' is possible: PHILIPS becomes '7 44 444 555 444 7 7777'. (3 taps of the 7 key generate the 3-rd letter R (the 7 key also refers to PQRS). LED-lights may be used to communicate a user that the entry of a brand was successful or not. Whether to use single-tap, multi-tap or any other variation is not relevant for the present invention.

Any number of digits is allowed, but it's possible to cap the maximum number of digits. In case of overlap (two different brands result in the same digit-sequence), a resolution can be to concatenate the list of Code-sets for both brands and iterate through these all in the scan process.

The SMS-keyboard entry of the brand may be used with the method as described with reference to FIG. 5 but also with the prior art method Brand-search (method 3).

Combine IR Codes from Different Code-Sets During the Scan Process.

Often, the scanning process will find multiple code-sets that trigger a reaction on the CE equipment. This is because there can be overlap between multiple code-sets. I.e. for code-set X the Power, digits and Teletext works ok, but volume does not, while for code-set Y the Power, digits and volume work but Teletext does not. In this case it's very practical when a user can indicate for a given matching code-set which codes do work and/or which codes do not. The URC can track this and combine the working codes of multiple code-sets into a new 'custom configuration' code set, which contains functions from multiple code-sets.

Figure 6:
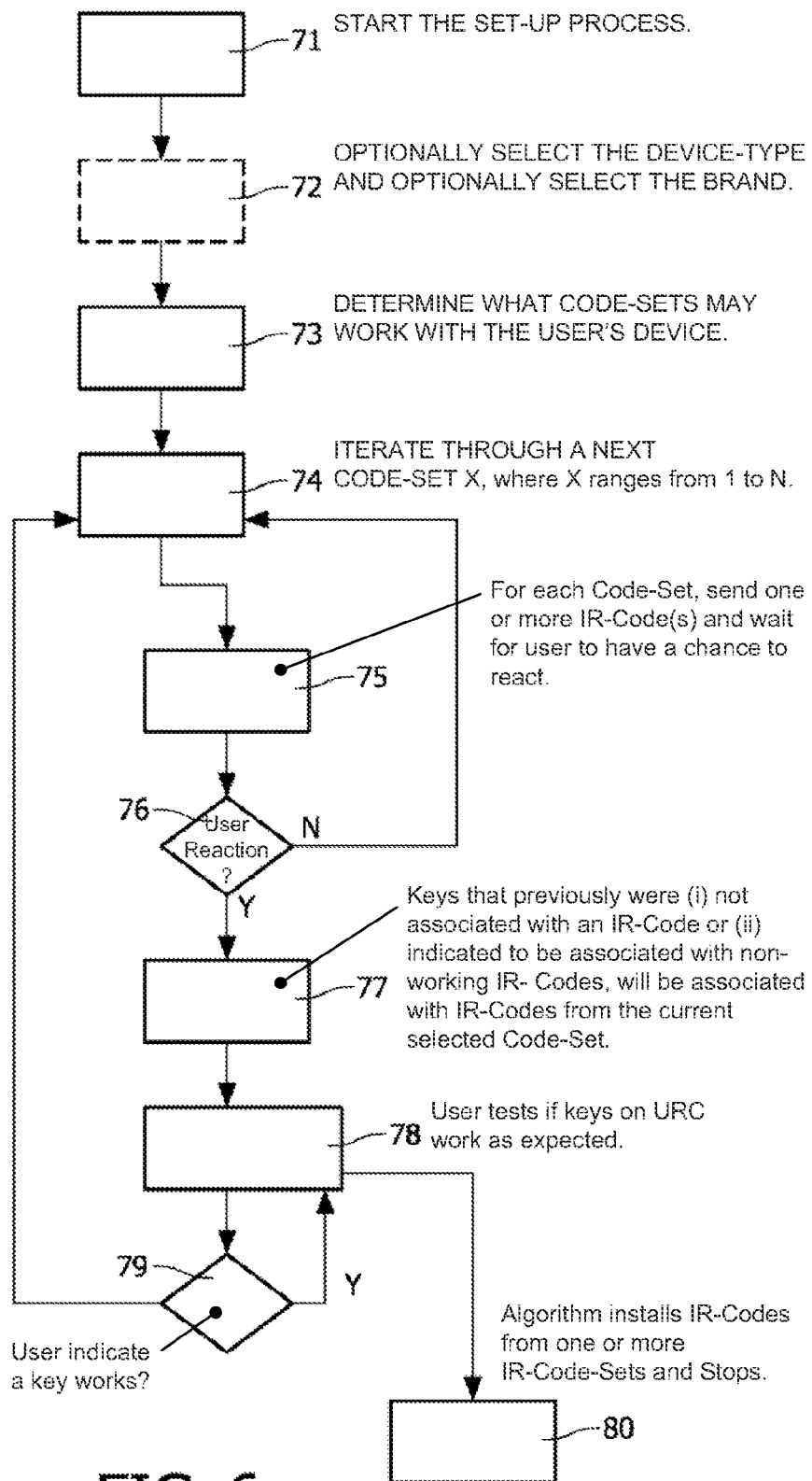
FIG. 6 shows steps to configure a URC using a further preferred method.

The scanning process is depicted in the flowchart shown in FIG. 6:

1. Start the set-up process, e.g. by pressing the right (magic) key (-combination). At this time none of the keys will have associated IR-codes (step 71).

2. Optionally select the device-type and optionally select the brand (step 72). This can be done in either order and may in practice be combined with step 71.

3. The algorithm determines what Code-sets may work for the user's device. Suppose there are N different Code-sets selected. These set of code-sets will be iterated through, starting with the first (step 73).

When the users indicates so (by pressing (and holding) a key) continue to next step.

4. The algorithm iterates through the next Code-set (step 74): Codeset x where x ranges from 1 to N.

5. For each Code-set in the iteration, the algorithm sends one or more IR-code(s) and wait some time to give the user the chance to react (step 75).

What IR-codes are actually sent-out depend on the progress in the algorithm. It may be a preconfigured IR-code or an IR-code for which the user indicated that it didn't work (see step 78).

6. The algorithm checks for a user reaction (indicating a sent IR-code triggers some function on the target device). This reaction is often the press (or release) of a key (step 76).

When the user doesn't react, the algorithm continues at step 74. When the user does react, the algorithm continues at step 77.

7. Assume that code-set i is selected. Keys that previously weren't associated with an IR-code or were indicated to be associated with non-working IR-codes, will be associated with IR-codes from code-set i (Step 77).

8. The user can now try pressing the keys on the URC to test if they work as expected (step 78). He has means to indicate whether the keys function correctly or not.

In different embodiments the way to indicate that differs. In a preferred embodiment the algorithm assumes all keys work OK unless the user keeps the key pressed. In other embodiments the user can, after pressing a key, press a thumbs-up or thumbs-down key to indicate if the previous key sent the correct command. Or alternatively, each key has a green and red backlight. Red means that the key doesn't work, green means that it does. Many alternatives can be conceived of.

If the user is happy with the result, he can choose to end the algorithm and store the current code-sets. (step 80).

9. The algorithm determines if the user indicated if a key doesn't work (step 79). If the user indeed indicates a key doesn't work continue at step 74 (now taking into account the user's feedback for working and non-working keys), otherwise return to step 78.

10. When the user is satisfied with all keys after step 77, the algorithm stops (step 80). It installs IR-codes from one or more IR-codesets.

Optionally, the user can indicate that he's still not happy with the current results and wants to start from scratch. In that case the user can jump to step 73 after indicating this.

In an alternative embodiment of this algorithm, key-groups are taken into account. This means that all keys that logically belong together will always be using IR-codes from the same IR-codeset. For example, the volume keygroup consists of 'volume up', 'volume down' and 'mute'. The teletext keygroup consists of all keys controlling teletext modes, the digits keygroup consists of all digits. In practice it is very likely that if one key of a certain keygroup works, all keys will work if their functions are taken from the same IR-codeset. This will speed up the set-up of the remote.

According to an alternative embodiment, the algorithm may abandon the concept of the keygroups in the following situation: if the first key of a keygroup works but the second (or subsequent) key of the key group does not work. In that case, the algorithm treats all keys in the keygroup, individually which means that the keys from the keygroup may use codes from different IR-code sets.

It is also possible to use the given feedback in steps 77 and 78 to limit or extend current set of remote control codesets while the algorithm is running. For example, when in step 78 the user feeds-back that a certain button is or isn't working, this information can be used to remove codesets from the set of codesets that haven't been iterated through yet. So if the user would indicate that the 'volume up' IR-code isn't working, the remote-control can omit trying another codeset with that same IR-code for the volume up function. Also when the user would indicate that the 'program down' function would be correct this information can be used.

The combination of IR codes from different code-sets may be used with the method as described with reference to FIG. 5 but also with the prior art methods "Autoscan" (method 2) and Brand-search (method 3).

Figure 7:
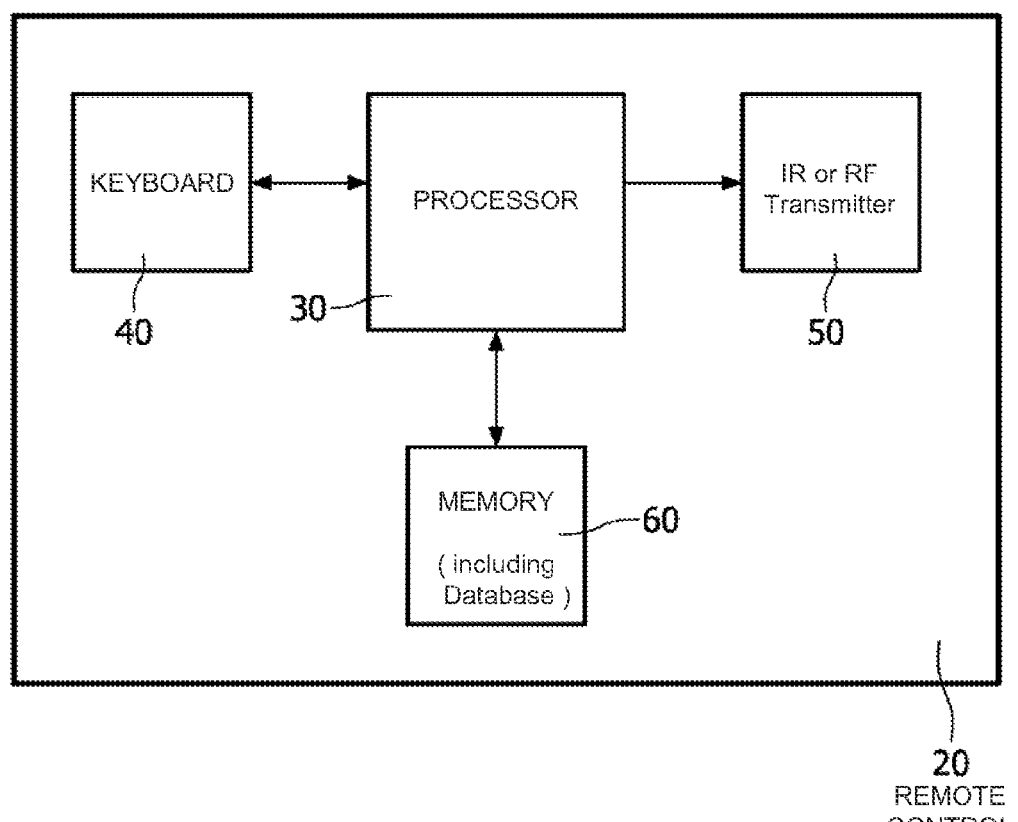
FIG. 7 shows a block diagram of a remote control suitable for implementing the present invention.

FIG. 7 shows a block diagram of a remote control 20 suitable for implementing the present invention. Only the relevant components are shown. The remote control 20 comprises a processor 30, a keyboard 40, an IR or RF transmitter 50 for transmitting control codes and a memory 60. The invention is preferably implemented by a suitable computer program stored in memory 60, which is run by processor 30. The brand-identifiers and code-set identifiers are also stored in the memory 60.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims. Any reference signs in the claims shall not be construed as limiting the scope.

The invention claimed is:

1. A method for setting up a Remote Control that includes a keyboard, a processor, a memory, and a transmitter, the method comprising the steps of:
    entering, via the keyboard and processor, a configuration mode;
    accepting, via the keyboard and processor, an identifier-entry; and
    scanning, via the processor and memory, though remote control code-sets in a database stored in the memory of the Remote Control, wherein the step of scanning comprises:
        in case that the identifier-entry is a brand-identifier that identifies a brand, (i) iterating, via the processor and memory, through the remote control code-sets corresponding to the brand and (ii) testing said remote control code-sets by sending, via the transmitter, to a Consumer Electronic device for a given iteration, one or more specific control code functions of a corresponding remote control code-set, and
        in case that the identifier-entry is a code-set-identifier that identifies a single remote control code-set which in not pointed to by a brand-identifier, testing the single remote control code-set corresponding to the code-set-identifier by sending, via the transmitter, to the Consumer Electronic device one or more specific control code functions of the corresponding single remote control code-set.

2. The method according to claim 1, wherein the iteration through remote control code-sets corresponding to the brand continues (i) until a user approval of a remote control code-set is entered, via the keyboard, or (ii) until all the remote control code-sets corresponding to the brand have been tested.

3. The method according to claim 1, further comprising the step of checking, via the processor, memory, and keyboard, for user approval of a remote control code-set and installing, via the processor and memory, the user approved remote control code-set for use by the Remote Control.

4. The method according to claim 1, wherein the step of testing a remote control code-set comprises the following steps:
    sending, via the transmitter, a remote control signal of the remote control code-set;
    checking, via the processor, memory, and keyboard, for a user reaction; and
    in case of a user reaction, enabling, via the processor, memory, and transmitter, to test keys of the Remote Control for the remote control code-set.

5. The method according to claim 1, further comprising the step of accepting, via the keyboard and processor, a device type entry.

6. The method according to claim 1, wherein if no user approval of a remote control code set has been entered, via the keyboard, during the step of scanning, a further scanning step is performed, scanning through further remote control code-sets.

7. The method according to claim 1, further comprising enabling, via the processor and memory, the use of a numerical keyboard for entering a brand-identifier comprising letters.

8. The method according to claim 1, wherein a numbering convention is used to distinguish between brand-identifiers and code-set-identifiers.

9. The method according to claim 1, wherein the identifier-entry is a "wild card" code, and upon detecting, via the processor and keyboard, that the "wild card" code is entered, scanning further comprises iterating through all code sets for at least a device type.

10. A non-transitory computer-readable medium embodied with a computer program that comprises computer program code executable by a processor to perform the steps of setting up a Remote Control of claim 1.

11. A method for setting up a Remote Control that includes a keyboard, a processor, a memory, and a transmitter, the method comprising the steps of:
    entering, via the keyboard and processor, a configuration mode;
    scanning, via the processor and memory, though remote control code-sets in a database stored in the memory of the Remote Control;
    testing, via the keyboard, if individuals keys of a code set send, via the transmitter, correct codes and receiving, via the keyboard, user-feedback on the correct and/or incorrect working of the tested keys;
    replacing, via the processor and memory, non-working codes with codes from at least a further remote control code-set; and
    combining, via the processor and memory, correct working codes from the scanned remote control code-sets into a new custom configuration code set and installing, via the processor and memory, the combined correct working codes of the new custom configuration code set for use by the remote control.

12. The method according to claim 11, where codes from the same remote control code-set are assigned to keys belonging to a certain key-group.

13. The method according to claim 11, where based on the testing step, the user-feedback is used to limit or extend a number of remote control code-sets that are scanned through.

14. Remote Control comprising:
    means for entering a configuration mode;
    means for accepting an identifier-entry; and
    means for scanning though remote control code-sets in a database stored in a memory of the Remote Control wherein the means for scanning are adapted for:
        in case that the identifier-entry is a brand-identifier that identifies a brand, (i) iterating through the remote control code-sets corresponding to the brand and (ii) testing said remote control code-sets by sending to a Consumer Electronic device for a given iteration, one of more specific control code functions of a corresponding remote control code-set; and in case that the identifier-entry is a code-set-identifier that identifies a single remote control code-set which is not pointed to by a brand-identifier, testing the single remote control code-set corresponding to the code-set-identifier by sending to the Consumer Electronic device one or more specific control code functions of the corresponding single remote control code-set.

15. Remote Control comprising:

means for entering a configuration mode;

means for scanning though remote control code-sets in a database stored in the memory of the Remote Control;

means for testing if individuals keys of a code set send correct codes and receiving user-feedback on the correct and/or incorrect working of the tested keys;

means for replacing non-working codes with codes from at least a further remote control code-set; and means for combining correct working codes from the scanned remote control code-sets into a new custom configuration code set and for installing the combined correct working codes of the new custom configuration code set for use by the remote control.

* * * * *